(12) United States Patent
Hagihara et al.

(10) Patent No.: US 11,913,172 B2
(45) Date of Patent: Feb. 27, 2024

(54) GLASS PLATE INTERLEAVING PAPER

(71) Applicant: OJI HOLDINGS CORPORATION, Tokyo (JP)

(72) Inventors: Koichi Hagihara, Tokyo (JP); Kazuhiko Shirai, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 615 days.

(21) Appl. No.: 16/496,205

(22) PCT Filed: Feb. 16, 2018

(86) PCT No.: PCT/JP2018/005392
§ 371 (c)(1),
(2) Date: Sep. 20, 2019

(87) PCT Pub. No.: WO2018/173572
PCT Pub. Date: Sep. 27, 2018

(65) Prior Publication Data
US 2020/0048840 A1 Feb. 13, 2020

(30) Foreign Application Priority Data
Mar. 24, 2017 (JP) ................. 2017-059844

(51) Int. Cl.
| | |
|---|---|
| D21H 17/63 | (2006.01) |
| B65D 57/00 | (2006.01) |
| D21H 17/66 | (2006.01) |
| B65G 49/06 | (2006.01) |
| B65D 85/48 | (2006.01) |

(52) U.S. Cl.
CPC .......... D21H 17/63 (2013.01); B65D 57/004 (2020.05); B65D 85/48 (2013.01); D21H 17/66 (2013.01); B65G 49/069 (2013.01)

(58) Field of Classification Search
CPC ........ D21H 17/63; D21H 17/68; D21H 27/00; D21H 5/00; D21H 17/25; D21H 17/66; B65D 57/004; B65D 85/48; B65G 49/069; C03B 40/033
See application file for complete search history.

(56) References Cited

U.S. PATENT DOCUMENTS

| | | | | |
|---|---|---|---|---|
| 9,321,574 B2* | 4/2016 | Garner | .................... | B65B 61/22 |
| 9,701,461 B2* | 7/2017 | Garner | ................. | B65D 81/127 |
| 10,047,483 B2* | 8/2018 | Hagihara | ............. | D21H 17/675 |
| 10,760,215 B2* | 9/2020 | Akahori | ............... | D21H 17/375 |
| 11,192,338 B2* | 12/2021 | Desai | ................. | B29C 48/0012 |
| 2009/0308774 A1* | 12/2009 | Kim | ....................... | B65D 85/48 156/60 |
| 2013/0108747 A1* | 5/2013 | Theisen | ................ | B65D 75/00 426/132 |
| 2013/0264007 A1* | 10/2013 | Noishiki | ................ | D21H 15/02 427/372.2 |
| 2017/0073897 A1* | 3/2017 | Akahori | ................. | D21H 17/63 |
| 2017/0152633 A1* | 6/2017 | Hagihara | ............. | B65D 57/004 |
| 2018/0305096 A1* | 10/2018 | Hagihara | ............... | D21H 17/72 |
| 2020/0048840 A1* | 2/2020 | Hagihara | ............... | B65D 85/48 |
| 2021/0061704 A1* | 3/2021 | Johnson | .................. | C03C 17/32 |

FOREIGN PATENT DOCUMENTS

| | | | | |
|---|---|---|---|---|
| CN | 103879657 A | | 6/2014 | |
| EP | 3225737 A4 * | 8/2018 | ........... | C03B 40/033 |
| EP | 3599309 A1 * | 1/2020 | ........... | B65G 57/005 |
| JP | 2007-070752 A | | 3/2007 | |
| JP | 2007-131965 A | | 5/2007 | |
| JP | 2009542534 A | | 12/2009 | |
| JP | 2013-204194 A | | 10/2013 | |
| JP | 2014118663 A | | 6/2014 | |
| JP | 2014118663 A * | 6/2014 | ............ | B65D 85/48 |
| JP | 2016-035125 A | | 3/2016 | |
| JP | 2016125146 A | | 7/2016 | |
| JP | 2016125146 A * | 7/2016 | | |
| JP | 2016191180 A * | 11/2016 | | |
| JP | 2016191180 A | | 11/2016 | |
| JP | 2017081578 A * | 5/2017 | ............ | B65D 57/00 |
| JP | 2017210286 A | | 11/2017 | |
| JP | 2017210286 A * | 11/2017 | | |
| JP | 2021055192 A * | 4/2021 | | |
| WO | WO-2008002584 A1 * | 1/2008 | ............ | B65D 57/00 |
| WO | WO-2018173572 A1 * | 9/2018 | ........... | B65D 57/004 |
| WO | WO-2019188927 A1 * | 10/2019 | ........... | B32B 17/065 |

OTHER PUBLICATIONS

Machine Translation (MT) of JP-2014118663 A. (Year: 2014).*
Machine Translation (MT) of JP-2017210286A (Year: 2017).*
Machine Translation (MT) of JP-2016125146 A (Year: 2016).*
Machine Translation (MT) of JP-2016191180 A (Year: 2016).*
Machine Translation of JP-2016035125 A. (Year: 2016).*
Machine Translation of JP-2016125146 A. (Year: 2016).*
Office Action from the Taiwanese Patent Office for counterpart Taiwan Application No. 107106128, dated Nov. 21, 2018.
Japanese Patent Office. Notice of Reasons for Refusal for related Japanese Patent Application No. 2019-507442, drafted Oct. 19, 2022, dated Oct. 25, 2022.
Japanese Patent Office. Notice of Reasons for Refusal for related Japanese Patent Application No. 2021-167585, drafted Sep. 22, 2022, dated Oct. 4, 2022.

(Continued)

*Primary Examiner* — Jose A Fortuna

(74) *Attorney, Agent, or Firm* — The Marbury Law Group, PLLC

(57) ABSTRACT

Provided is a glass plate interleaving paper including cellulose pulp as a main component. A percentage of aluminum content is below 0.2 mass %, and a basis weight is in a range from 10 to 100 g/m². Further, it is preferred that the glass plate interleaving paper have a percentage of aluminum content below 0.01 mass %. Still further, it is preferred that the glass plate interleaving paper have a percentage of talc content below 0.1 mass %.

1 Claim, No Drawings

(56) References Cited

OTHER PUBLICATIONS

Japanese Patent Office. Notice of Reasons for Refusal for Japanese Patent Application No. 2022-198797, drafted Apr. 25, 2023, dated May 9, 2023.

* cited by examiner

GLASS PLATE INTERLEAVING PAPER

RELATED APPLICATIONS

This application is a national phase entry of international patent application PCT/JP2018/005392 filed Feb. 16, 2018, which claims benefit of priority to Japanese Application Serial No. 2017-059844, filed Mar. 24, 2017, the entire disclosures of which are incorporated herein by reference in their entireties.

TECHNICAL FIELD

The present invention relates to an interleaving paper to be inserted between glass plates. More specifically, the present invention relates to a glass plate interleaving paper used in a distribution process and a manufacturing process in which glass substrates for use in flat panel displays such as liquid crystal displays, organic electroluminescence displays, and plasma displays are stacked up for storage and transportation.

BACKGROUND ART

Glass plate interleaving papers have been facing increasing quality demands associated with diversification in glass applications in recent years. For instance, in a case of a glass substrate used for a flat panel display such as a liquid crystal display, microscopic electronic components and the like are formed on a surface of the glass substrate. Accordingly, if the surface has tiny scratches and contaminants, those flaws will be responsible for faults such as disconnection, thus leading to product defects. This is why the surface of the glass substrate is required to have a high degree of clearness.

Along with an increase in size as well as advance of mass production of glass substrates in recent years, there have been many cases of transportation while stacking the glass plates for the purpose of increasing transportation efficiency. When the glass plates are stacked up, a contact pressure between the glass plate interleaving paper (hereinafter also referred to as an "interleaving paper" as appropriate) and each glass substrate is increased, and this increase brings about a higher probability that foreign substances contained in the interleaving paper will adhere to (contaminate) the glass substrate. On the other hand, the surface of the glass substrate is required to have even a higher degree of clearness to meet the progress in high-definition flat panel displays. Given the circumstances, quality demand levels for the interleaving papers are escalating.

A process of manufacturing raw material pulp and a process of making interleaving papers from the raw material pulp may bring about commingling of foreign substances in the raw material with the interleaving papers. In the meantime, addition of various chemical substances may incur contaminations due to adverse effects of those additives. In the course of storage and transportation, it is desirable that the aforementioned foreign substances and contaminants adhere to the surface of the glass substrate as little as possible.

The foreign substances and the contaminants include: a natural resin and a gum substance separated from wood, pulp, and paper; organic water-insoluble substances deriving from the additives and others; and so forth. Specific examples thereof include a sticky natural resin (pitch) deriving from wood, synthetic resins contained in the additives, and resins of organic polysiloxane compounds as typified by polydimethylsiloxane.

A glass plate, or a glass substrate used for a flat panel display in particular, undergoes a process to clean a glass surface with a medium mainly containing water prior to shipment or a process to mount electronic components and the like thereon. This process rinses off major foreign substances such as paper dust adhering to the surface of the glass substrate. However, it is highly likely that the resin (pitch) and the foreign substances having adhesiveness and other substances having high affinities to the glass may still adhere to the glass surface even after the cleaning.

A pitch control agent may be used in the pulp manufacturing process and in the papermaking process in order to reduce damage attributed to the resin (pitch). The pitch control agent is a substance that avoids adhesion of the resin (pitch) in the manufacturing process and the papermaking process. To be more precise, talc, aluminum sulfate, surfactants, cationic polymers, and the like have been known as such agents.

For instance, Patent Literature 1 discloses a configuration to reduce a ratio of talc present on a surface and instead to use any of a surfactant, a cationic polymer, aluminum sulfate, and the like as a non-talc pitch control agent.

CITATION LIST

Patent Literature

Patent Literature 1: Japanese Patent Application Publication No. 2016-125146

SUMMARY OF INVENTION

Technical Problem

However, the method of using the pitch control agent disclosed in Patent Literature 1 may incur a flocculate composed of the resin (pitch) and the pitch control agent. In this regard, this method is not exactly sufficient for an application to an interleaving paper for a glass substrate that is required to have an extremely high degree of clearness.

The present invention has been made in view of the aforementioned circumstances. Specifically, it is an object of the present invention to provide a glass plate interleaving paper which causes a flocculate including a resin component as a main constituent to adhere less to a glass substrate.

To solve this problem, the inventors of the present invention have conducted an analysis on adhering foreign substances that brought about product defects due to failures of formation of electronic components and the like. As a result, the adhering foreign substances turned out to be flocculates each having a size of at least several tens of micrometers and containing a resin component. As the analysis was conducted further, it became evident that aluminum ions were released from aluminum sulfate added as the pitch control agent, then anionic substances and the like were formed into a flocculate due to strong flocculating power possessed by the aluminum ions, and this flocculate was coarsened into the adhering foreign substance.

The present invention has been made on the basis of the above-mentioned knowledge. Specifically, the present invention provides the following configurations:

(1) a glass plate interleaving paper including cellulose pulp as a main component, in which a percentage of aluminum content is below 0.2 mass %, and a basis weight is in a range from 10 to 100 g/m$^2$;

(2) the glass plate interleaving paper of (1), in which the percentage of aluminum content is below 0.01 mass %; and (3) the glass plate interleaving paper of (1) or (2), in which a percentage of talc content is below 0.1 mass %.

Advantageous Effects of Invention

According to a glass plate interleaving paper of the present invention, it is possible to cause a flocculate including a resin component as a main constituent to adhere less to a glass substrate.

DESCRIPTION OF EMBODIMENTS

The present invention will be described below in concrete terms. Note that an embodiment discussed in the following is a mere example and does not intend to limit the scope of the present invention.

A glass plate interleaving paper of this embodiment includes cellulose pulp as its main component, and has a percentage of aluminum content below 0.2 mass % and a basis weight in a range from 10 to 100 g/m².

(Aluminum)

The inventors have conducted an analysis on adhering foreign substances that brought about product defects such as electronic components. As a result, the adhering foreign substances turned out to be flocculates formed by flocculation of a resin component and each having a size of at least several tens of micrometers. Moreover, the flocculates turned out to contain aluminum.

This aluminum mainly derives from aluminum sulfate that is used as a papermaking chemical. Aluminum sulfate not only serves as a pitch control agent but also has a function to fix a sizing agent, a function to improve freeness, and a function to inhibit pulp sludge from adhering to papermaking machinery. Accordingly, aluminum sulfate is frequently added in order to stabilize operability in manufacturing interleaving papers.

The following is a mechanism of aluminum sulfate functioning as the pitch control agent. The aluminum ions released from aluminum sulfate have a cationic property and therefore bind pulp fiber and an anionic resin or the like together and bring them into paper. As a consequence, the occurrence of damage due to the resin and the like is suppressed.

On the other hand, if a certain amount or more of aluminum sulfate is added, the resin (pitch) particles are flocculated and developed into a coarsened flocculate that constitutes a foreign substance in the paper, so to speak. Such coarsened flocculates are prone to bring about product defects of electronic components and the like therein.

With the aforementioned results in mind, the inventors have reached a finding that the percentage of aluminum content needs to be set below 0.2 mass % in order to inhibit the flocculate including the resin component as its main constituent from adhering to the glass plate interleaving paper. The percentage of aluminum content is preferably set below 0.01 mass %.

Moreover, if talc is present, talc particles may adsorb the resin (pitch) and get flocculated, and a flocculate thus developed may become a foreign substance in the paper.

Given the situation, an upper limit of a percentage of talc content has also been investigated. As a consequence, the inventors have found out that it is preferable to set the percentage of talc content below 0.1 mass %. The percentage of talc content is more preferably set below 0.01 mass %.

Here, the paper using the certain amount or more of aluminum sulfate as the papermaking chemical is formed into a so-called acid paper when hot-water extraction pH measured in compliance with JIS P8133 falls within a range of about 4 to 5.5, for example.

(Cellulose Pulp)

The glass plate interleaving paper of this embodiment includes cellulose pulp as its main component. As the cellulose pulp, various types of cellulose pulp can be used alone or by mixing two or more types thereof. Examples of the cellulose pulp include: chemical pulp such as kraft pulp (KP), sulfite pulp (SP), and soda pulp (AP); semichemical pulp such as semichemical pulp (SCP) and chemi-ground wood pulp (CGP); mechanical pulp such as groundwood pulp (GP), thermo-mechanical pulp (TMP, BCTMP), and refiner groundwood pulp (RGP); non-wood fiber pulp made from raw materials such as kozo (*Broussonetia kazinoki* x *B. papyrifera*), mitsumata (*Edgeworthia chrysantha*), hemp, kenaf, and the like; and so forth. As for the wood pulp, the wood pulp may be any of softwood pulp, hardwood pulp, and a mixture thereof. Moreover, kraft pulp (KP) with a low content of a sticky natural resin component deriving from wood is preferred as the wood pulp. Here, adoption of the cellulose pulp as the main component means that the percentage of the cellulose pulp is higher than 50 mass %, or preferably equal to or higher than 70 mass %, or even more preferably equal to or higher than 90 mass % relative to the mass of the interleaving paper.

A beating degree of such cellulose pulp is preferably set in a range from 200 to 700 mlcsf. Here, the beating degree is equivalent to the Canadian standard freeness according to JIS P8121. By setting the beating degree in the range from 200 to 700 mlcsf, it is possible to impart necessary mechanical strength and workability to the interleaving paper. If the beating degree falls below 200 mlcsf, the glass plate interleaving paper has a higher density with a lower cushioning characteristic, and is therefore prone to cause more scratches on the glass surface. If the beating degree exceeds 700 mlcsf, the strength of the paper is weakened and the interleaving paper is prone to break during conveyance in the transportation process and the manufacturing process. The beating degree is more preferably set in a range from 350 to 600 mlcsf. A method of beating the pulp can apply a publicly known method in order to control the beating degree within the range from 200 to 700 mlcsf.

(Papermaking Chemicals)

As for papermaking chemicals to be used at the time of making the glass plate interleaving paper, various publicly known chemicals can be used as far as the chemicals do not contaminate the glass surface or do not scratch the glass surface. Examples of the papermaking chemicals include: sizing agents such as rosin, styrene maleic acid, alkenyl succinic anhydride, and alkyl ketene dimer; paper strength additives such as polyacrylamide; freeness retention aids; water resistant additives such as polyamide-polyamine-epichlorohydrin; softeners; antistatic agents; defoamers;

slime control agents; filler; dyes; and so forth. These papermaking chemicals are liable to contaminate the glass plate and are preferably controlled at no more than 0.1 mass % in total even when added.

(Manufacturing Method of Interleaving Paper)

There are no particular limitations to a method of manufacturing the glass plate interleaving paper. The glass plate interleaving paper can therefore be made by using various papermaking machines while selecting various papermaking conditions. To be more precise, examples of such a papermaking machine include a fourdrinier former, a twin-wire former, a cylinder former, an inclined former, and the like. A layer structure of the glass plate interleaving paper may be either single-layered or multi-layered.

(Characteristics of Glass Plate Interleaving Paper)

A smaller basis weight of the glass plate interleaving paper is preferred because its mass is thus reduced at the time of transportation. However, it is not possible to provide the glass plate with a sufficient shock-absorbing characteristic if its basis weight is too small. On the other hand, a large basis weight of the interleaving paper to some extent is preferred in light of the shock-absorbing characteristic. Nonetheless, the large mass at the time of transportation is not preferred when the basis weight is too large. In consideration of a balance between the shock-absorbing characteristic and the ease of transportation, a proper range of the basis weight of the interleaving paper is from 10 to 100 g/m$^2$. It is preferable to set the basis weight of the interleaving paper in a range from 35 to 80 g/m$^2$.

From the viewpoint of shock-absorbing characteristic and workability, a thickness of the glass plate interleaving paper is preferably in a range from 25 to 250 μm. Meanwhile, the density of the glass plate interleaving paper is in a range from 0.4 to 1.2 g/cm$^3$.

EXAMPLES

The present invention will be described below in further detail with reference to examples. However, the present invention is not limited to these examples. Note that numerical values that explain blending represent numerical values based on the mass of solid contents or active ingredients. In the meantime, the manufactured paper underwent the treatments in compliance with JIS P8111 and was then subjected to a measurement and an evaluation test unless otherwise specifically stated herein.

<Percentage of Aluminum Content in Interleaving Paper>

Using an x-ray fluorescence spectrometer (PW2404 manufactured by Spectris plc), the percentage of aluminum content (mass %) in each interleaving paper was obtained based on a calibration curve plotted by using an interleaving paper containing a prescribed amount of aluminum.

<Percentage of Talc Content in Interleaving Paper>

Each glass plate interleaving paper was subjected to an asking process in compliance with JIS P8251. Next, using an x-ray fluorescence diffractometer (RINT-Ultima III manufactured by Rigaku Corporation), the percentage of talc content (mass %) in an ash content thus obtained was sought based on a calibration curve plotted by using an interleaving paper containing a prescribed amount of talc. The percentage m of talc content in the glass plate interleaving paper was obtained by using the following formula (1):

$$m=(b/a) \times c \times 100 \qquad (1),$$

where m: percentage of talc content (mass %), a: mass of glass plate interleaving paper (g), b: mass of ash content (g), and c: percentage of talc content in ash (mass %).

<Contamination Behavior on Glass Plate>

(Contamination Test on Surface of Glass Plate)

A glass plate interleaving paper having dimensions of 310 mm×310 mm was placed on a flat panel display glass plate having dimensions of 300 mm×300 mm, and pressing operations were repeated by applying a pressure of 0.7 MPa for 10 seconds each time. To be more precise, using the same flat panel display glass plate having the dimensions of 300 mm×300 mm, the glass plate interleaving paper having the dimensions of 310 mm×310 mm was replaced with a new one every time the pressing operation took place. The tested flat panel display glass plate was obtained after repeating the pressing operations 100 times.

(Evaluation of Contamination Behavior on Surface of Glass Plate)

The surface of the flat panel display glass plate after having been undergone the above-mentioned test was rinsed off with water. Then, dirt on the surface of the glass plate was visually checked and counted by using a microscope while spotlighting the surface of the glass plate. A contamination behavior on the glass plate was evaluated as defined below:

Excellent: no dirty marks;

Good: one dirty mark; and

Bad: two or more dirty marks.

<Scratch Development Behavior>

(Scratch Development Test on Surface of Glass Plate)

In the method of placing the glass plate interleaving paper having the dimensions of 310 mm×310 mm on the flat panel display glass plate having the dimensions of 300 mm×300 mm and applying the pressure of 0.7 MPa for 10 seconds, the same flat panel display glass plate having the dimensions of 300 mm×300 mm was used and the glass plate interleaving paper having the dimensions of 310 mm×310 mm was replaced with a new one every time the pressing operation took place. The tested flat panel display glass plate was obtained after repeating the pressing operations 2000 times.

(Evaluation of Scratch Development Behavior on Surface of Glass Plate)

The surface of the flat panel display glass plate after having been undergone the above-mentioned test was cleaned by brushing. Then, scratches on the surface of the glass plate were visually checked and counted by using a microscope while spotlighting the surface of the glass plate. A scratch development behavior was evaluated as defined below:

Good: zero to four scratches observed;

Bad: five or more scratches observed.

Example 1

A pulp slurry (the beating degree 450 mlcsf) containing 100% of commercially available needle bleached kraft pulp (NBKP) with the percentage of talc content at 0 mass % was put into a fourdrinier machine without adding aluminum sulfate or any other papermaking chemicals, and was then dried. Thus, a glass plate interleaving paper at the basis weight of 50 g/m² was obtained.

Example 2

A glass plate interleaving paper was obtained in the same way as Example 1 except for the use of a pulp slurry prepared by adding aluminum sulfate hexadecahydrate at 1 mass % relative to the bone dry pulp mass. The percentage of aluminum content of the obtained glass plate interleaving paper was 0.08 mass %.

Example 3

A glass plate interleaving paper was obtained in the same way as Example 1 except for the use of a pulp slurry containing 100% of commercially available needle bleached kraft pulp (NBKP) with the percentage of talc content at 0.2 mass %. The percentage of talc content of the obtained glass plate interleaving paper was 0.05 mass %.

Comparative Example 1

A glass plate interleaving paper was obtained in the same way as Example 2 except for addition of aluminum sulfate hexadecahydrate at 4 mass %. The percentage of aluminum content of the obtained glass plate interleaving paper was 0.31 mass %.

Comparative Example 2

A glass plate interleaving paper was obtained in the same way as Example 1 except for the use of a pulp slurry containing 100% of commercially available needle bleached kraft pulp (NBKP) with the percentage of talc content at 1 mass %. The percentage of talc content of the obtained glass plate interleaving paper was 0.25 mass %.

Comparative Example 3

A glass plate interleaving paper was obtained in the same way as Comparative Example 2 except for the setting of the beating degree at 150 mlcsf.

TABLE 1

| | Additive rate of aluminum sulfate hexadecahydrate to raw material (mass %) | Additive rate of talc to raw material (mass %) | Percentage of aluminum content in interleaving paper (mass %) | Percentage of talc content in interleaving paper (mass %) | Contamination behavior of glass plate | Scratch development behavior |
|---|---|---|---|---|---|---|
| Example 1 | 0 | 0 | 0 | 0 | Excellent | Good |
| Example 2 | 1 | 0 | 0.08 | 0 | Excellent | Good |
| Example 3 | 0 | 0.2 | 0 | 0.05 | Good | Good |
| Comparative Example 1 | 4 | 0 | 0.31 | 0 | Bad | Good |
| Comparative Example 2 | 0 | 1 | 0 | 0.25 | Bad | Good |
| Comparative Example 3 | 0 | 1 | 0 | 0.25 | Bad | Bad |

Evaluation results of Examples 1 to 3 and of Comparative Examples 1 to 3 are shown in Table 1. The glass plate interleaving papers of Examples 1 to 3 exhibited excellent glass plate contamination behaviors. Meanwhile, as compared to Example 3 containing talc, Example 1 and Example 2 containing no talc exhibited more excellent glass plate contamination behaviors. On the other hand, the glass plate interleaving papers of Comparative Example 1 and Comparative Example 2 exhibited poor glass plate contamination behaviors. The glass plate interleaving paper of Comparative Example 3 exhibited a poor glass plate contamination behavior and a poor scratch development behavior.

The invention claimed is:

1. A glass plate interleaving paper comprising:
    cellulose pulp as a main component;
    more than 0 mass % aluminum sulfate; and
    talc,
    wherein the glass plate interleaving paper further comprises no more than 0.1 mass % in total of papermaking chemicals,
    wherein the glass plate interleaving paper comprises 0 mass % of papermaking surfactants and cationic polymers, and wherein the glass plate interleaving paper has:
  less than 0.01 mass % of aluminum ions released from the aluminum sulfate;
  a talc content of below 0.1 mass %; and
  a basis weight in a range of from 10 to 100 g/m².

* * * * *